United States Patent [19]

Schönfeld, deceased et al.

[11] Patent Number: 5,713,975

[45] Date of Patent: Feb. 3, 1998

[54] METHOD AND APPARATUS FOR PRODUCING BLANK-MOLDED GLASS BODIES FOR OPTICAL EQUIPMENT

[75] Inventors: Günter Schönfeld, deceased, late of Wiedelach; Thomas Schonfeld, executor, Berlin, both of Germany

[73] Assignee: Deutsche Spezialglas AG, Germany

[21] Appl. No.: 618,766

[22] Filed: Mar. 20, 1996

[30] Foreign Application Priority Data

Mar. 21, 1995 [DE] Germany ............... 195 10 195.2

[51] Int. Cl.[6] .......................... C03B 11/07; C03B 40/04
[52] U.S. Cl. ................... 65/25.1; 65/65; 65/66; 65/104; 65/182.2; 65/260; 65/275; 65/284
[58] Field of Search ......................... 65/65, 66, 83, 65/104, 182.2, 260, 275, 284, 25.1

[56] References Cited

U.S. PATENT DOCUMENTS

| | | | |
|---|---|---|---|
| 3,531,272 | 9/1970 | Menear | 65/120 X |
| 3,811,857 | 5/1974 | Deeg et al. | 65/65 |
| 3,814,296 | 6/1974 | Schaich | 65/73 |
| 3,922,156 | 11/1975 | Martin | 65/272 |
| 3,930,819 | 1/1976 | Martin | 65/25.1 |
| 3,961,927 | 6/1976 | Alderson et al. | 65/25.1 |
| 4,012,215 | 3/1977 | Schwab et al. | 65/66 |

FOREIGN PATENT DOCUMENTS 2 410 923   9/1974   Germany.

*Primary Examiner*—Donald E. Czaja
*Assistant Examiner*—Sean Vincent
*Attorney, Agent, or Firm*—Michael D. Bednarek; Kilpatrick Stockton LLP

[57] ABSTRACT

When blank-molded optical glass bodies are manufactured according to known methods based on blank-molding technology, the product exhibits rings in the glass and folds as well as an impression that precisely coincides with the contact surface of the parison inside the pressing die before the pressing operation. These defects are not permissible in blank-molded lenses, however, because they cause an undesirable optical effect such as changing the glare value in automobile headlights. Such defects are process-dependent and are caused by the fact that the transfer of the parison to the pressing die and the pressing itself are two separate operations that are performed with different tools. According to the invention, the formation of folds and rings in the glass as well as an impression of the contact surface of the parison are prevented by the fact that the removal and the transfer of the parison to the pressing die and the pressing cycle are performed without interruption with one and the same tool (multi-purpose tool). In a further development of the invention, the pressing operation is performed in two steps to take into account the given thermal inhomogeneities in the formed bodies.

6 Claims, 1 Drawing Sheet

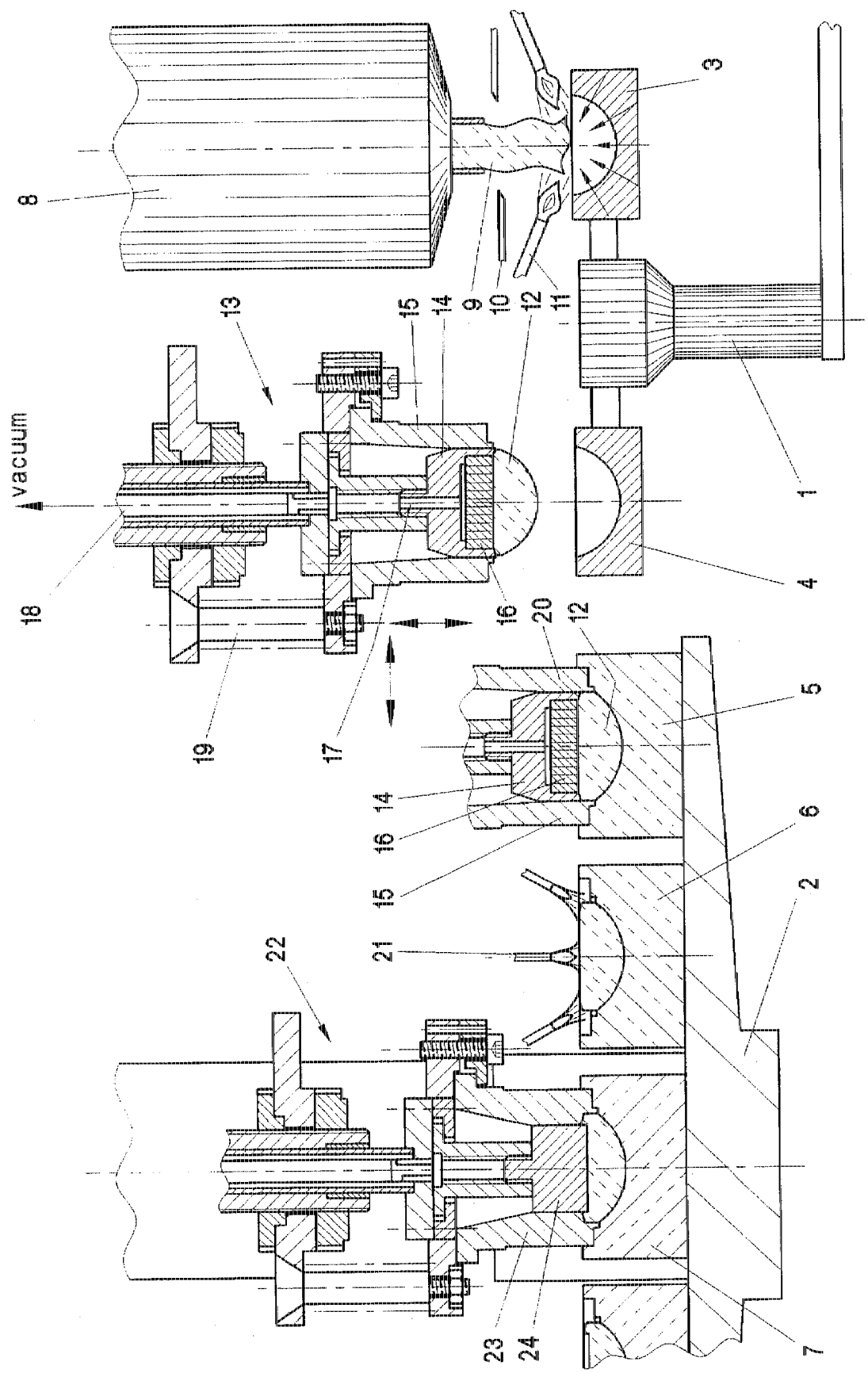

METHOD AND APPARATUS FOR PRODUCING BLANK-MOLDED GLASS BODIES FOR OPTICAL EQUIPMENT

FIELD OF THE INVENTION

The present invention relates to the field of producing blank-molded glass bodies that are used to make optical equipment, such as lenses or prisms. More specifically, the present invention relates to an apparatus and method for blank-molding molten glass gobs on a rotary indexed table and then transferring the resulting parisons to a pressing die for pressing while preventing any optical flaws from occurring in the glass.

BACKGROUND OF THE INVENTION

In blank-molding technology, a molten glass gob is introduced into a blank-mold. The blank-mold is intended to shape the glass gob to a general size and shape that will then be more precisely formed by other processes into optical equipment such as a lens or prism. The blank-molded glass, before it is finally transformed into precision optical equipment, is known as a parison or pre-form.

Following blank-molding, the parison or pre-form is removed from the blank-mold after a specified period of time. Generally, the parison is then transferred to a pressing die where it can be reheated and pressed into a more finished piece of optical equipment. In some applications, transforming the parison into the desired lens or prism with the necessary optical characteristics may also require cutting, grinding and polishing. Methods are known in the art for producing glass bodies for optical equipment, such as lenses or prisms, by reheating and pressing blank-molded (fire-polished) glass gobs in highly polished molds.

Manual pressing and any additional operations that may be necessary are time consuming and costly. However, the demand for blank-molded glass bodies, especially to make lenses for automobile headlights, is very high. Accordingly, automated processes for producing finished lenses from the liquid phase of the glass have been created. Such automated production is made possible, for instance, by the above described blank-molding-technology which is known in the art, for example, from DE-A-24 10 923.

In this known method, the removal and transfer of the parison to the pressing die and the pressing cycle are two chronologically separate processes that are executed with different tools. A suction pad is provided for the removal and transfer of the parison from the blank-mold to the pressing die. A plunger is then used for the pressing cycle. This interruption of the molding work cycle, during which the parison surface to be pressed is partially exposed, causes the formation of folds in the glass. Furthermore, during the interruption, the parison in the pressing die assumes a defined shape that can no longer be corrected in the pressing cycle. This causes the formation of visible rings in the glass and an impression in the glass where the parison comes in contact with the pressing die before the pressing operation begins. Such defects are unacceptable in blank-molded glass bodies intended for optical use as lenses. Such defects have a very negative impact on the optical performance characteristics of the finished lens. Thus, there is a need for a method of blank-molding and pressing glass parisons without allowing optical flaws to occur in the glass due to the lapse of time between transfer from the blank-mold and the pressing cycle in the pressing die.

In manufacturing some glass bodies, such as aspherical condenser lenses for automobile headlights, the pressing operation alone is insufficient. Additional cutting, grinding, and polishing processes are required. In the manufacture of such condenser lenses, only the aspherical face is blank-molded while the plane face opposite the blank face is cut, ground, and polished in mechanical operations. These condenser lenses must also include a flange-like rim.

Additional problems in forming such condenser lenses arise because of the required flange-like rim. In the automated process, a temperature drop exists from the core to the peripheral area of the glass body being formed into a condenser lens. Due to the higher core temperature, the glass body contracts during the cooling process after the pressing cycle. This in turn results in a deformation of the aspherical face, particularly in the transition region to the flange-like rim.

Accordingly, there is a further need for a method and apparatus to construct blank-molded, post-pressed condenser lenses for automobiles without allowing the temperature difference between the core and the periphery to deform the aspherical face of the lens through contraction during cooling.

SUMMARY OF THE INVENTION

Accordingly, it is the object of the invention to meet the above stated needs and others. Specifically, it is an object of the present invention to introduce a blank-molding and pressing method for constructing optical equipment that avoids the formation of optical flaws in the glass, i.e., rings, folds and impressions, that tend to occur using the prior art methods of constructing optical equipment. It is a further object of the invention to provided a method and apparatus that allow the formation of aspherical condenser lenses without allowing the internal temperature differential to deform the lens.

Additional objects, advantages and novel features of the invention will be set forth in part in the description that follows, and in part will become more apparent to those skilled in the art upon examination of the following or may be learned by practice of the invention. The objects and advantages of the invention may be realized and attained by means of the instrumentalities and combinations particularly pointed out in the appended claims To achieve the stated and other objects of the present invention, as embodied and described below, the invention may comprise the following: A method and apparatus of automated lens production which comprises a rotary indexing table with circularly arranged blank-molds in which parisons are formed from glass globs that are dispensed by a glass dispenser, such molds having very small openings in their lower areas for introducing an air cushion, and a tool to transfer the parison to a pressing die arranged separately from the rotary indexing table in a transfer station where the pressing cycle is executed.

An object of the invention is attained by removing and transferring the parison to the pressing die and the pressing cycle without any interruption and with one and the same tool (multi-purpose tool). An object of the invention is attained by a multi-purpose tool that comprises a pressing die and a removal tool. The pressing die consists of a plunger and a annular bezel sleeve. A suction pad that is integrated in the face of the plunger acts as the removal tool. The multi-purpose tool is connected to a low pressure source whereby it can be moved both vertically and horizontally between the blank-mold and the pressing die.

According to the present invention, this combination of purposes in one multi-purpose tool, removing and transferring the parison to the pressing die and performing the pressing cycle itself, makes it possible to entirely form the optical equipment at one time, that is, without interruption. This inhibits the formation of rings in the glass due to standing and an impression made by the parison contact area.

A further object of the invention is met by introducing a two-step process to press aspherical condenser lenses with a flange-like rim. In a first step, the multi-purpose tool is used to press the curved lens face and to mold on top of the curved lens face a volume of glass that is subsequently molded into the required flange-like rim. After the tool is removed, the entire upper plane face, including the preformed rim, is fire-polished. In the second step, an additional pressing die adapted to the final lens shape is used to press the flange-like rim out of the pre-formed volume of glass and at the same time correct the deformation of the aspherical face caused by cooling in the glass core. This two-step molding process makes it possible to blank-mold aspherical condenser lenses with flange rims to a perfect optical quality.

BRIEF DESCRIPTION OF THE DRAWING

The accompanying drawing, which is incorporated in and forms a part of the specification, illustrates the present invention and, together with the description, serve to explain the principles of the invention.

The Figure is a partial schematic section of a manufacturing plant that uses the method and apparatus of the present invention for forming aspherical condenser lenses with flange-like rims.

DETAILED DESCRIPTION

Using the drawing, a preferred embodiment of the present invention will now be explained.

As shown in the drawing, the apparatus of the present invention has two rotary tables, 1 and 2, provided with a series of circularly arranged molds which correspondingly move along an arc and are cyclically switched to various stations. Such rotary tables are known in the art. Rotary table 1 is the blank-molding table of which two blank-molds, 3 and 4, are depicted. Rotary table 2 is the pressing table of which three pressing dies, 5, 6 and 7, are depicted at three different stations where some of the steps of the present invention are accomplished.

The blank-molding table 1 has a glass dispenser 8 from which viscous liquid glass gobs 9 can be drawn. A defined length sufficient to fill the lens-shaped blank-mold 3 is cut by means of a cutting mechanism 10 and transferred to the blank-mold. If necessary, conventional burners 11 can be used to keep the glass liquid.

In its lower area (not depicted), each blank-mold has a very small opening for introducing an air cushion. The glass, due to surface tension and gravity as well as the pressure of the air cushion, is kept in a suspended state in which it is molded without touching the surface of the blank-mold. This creates a parison that is also referred to as a blank.

The depicted rotary table 1 holds a blank-mold 4 that has been filled during the previous cycle by the liquid glass dispenser 8 and then rotated by rotary table 1 so as to be under the multi-purpose tool 13. At the transfer station, which is the position under the tool 13, the parison 12 is removed from the blank-mold and transferred by a method that will be discussed below to the pressing die 5 at the corresponding transfer station of rotary pressing table 2.

Assigned to the transfer stations is a multi-purpose tool, generally designated as 13, which can be lifted and lowered and horizontally moved back and forth as indicated by the corresponding arrows. This tool 13 has a pressing tool comprised of a plunger 14 and a annular bezel sleeve 15.

The plunger 14 has a suction pad 16 on its face which has numerous little suction channels that open into a central bore hole 17 in the plunger 14. The bore hole 17 is in turn coupled to a suction tube 18 that is connected to a vacuum source. The tool 13 is constructed in such a way that the plunger 14 with suction pad 16 and with the annular bezel sleeve 15, in the depicted upper position, can be moved by an operating mechanism (not depicted) that is preferably a hydraulic mechanism.

The annular bezel sleeve 15 can be moved into a lower position by sliding over the plunger by means of a preferably hydraulic operating mechanism 19. The tool 13 is furthermore connected to a horizontal guiding mechanism for horizontal back and forward movement that is not depicted. Such guiding mechanisms are prior art and need not be further detailed here.

After a defined period of time which is determined by the cycle time and the number of blank-mold stations of table 1, the parison is transferred to the pressing die 5 of table 2. To transfer the parison 12 from the blank form 4 to the pressing die 5, the suction pad 16 is moved to its lower position until it touches the free surface of the parison. The suction force effected by the vacuum source causes the parison 12 to adhere to the suction pad 16 during the following operation in which the suction pad, including the plunger 14, is lifted. This lifted position is depicted in the drawing. The annular bezel sleeve 15 still remains in its previous upper position.

After the suction pad 16 and the adhering parison 12 have reached the upper position, the entire tool 13 is moved horizontally to the left until it is located above the pressing die 5 in the transfer station of rotary table 2. The tool 13 is then lowered until the annular bezel sleeve 15 is centered inside the pressing die 5 as depicted in the drawing. The glass gob on the suction pad 16, parison 12, is then pressed into the pressing die 5 by plunger 14.

Thus, the suction pad 16 used to remove the parison 12 from the blank-mold 4 and to transfer it to the pressing die 5 also acts as the plunger to effect pressing when the parison 12 is transferred to the pressing die 5. This prevents a chronological interruption during molding. In all the previously known methods, the transfer of the glass gob and the pressing cycle are two chronologically discrete operations. These methods leave a visible glass ring on the product and an impression that exactly coincides with the contact area of the parison before the pressing operation. Such defects, however, are not acceptable in blank-molded lenses.

According to the invention, by contrast, the transfer of the parison 12 to the pressing die 5 and the pressing cycle occur in immediate succession. The pressing tool, comprised of the plunger 14, suction pad 16, and the annular bezel sleeve 15, acts first as a suction mechanism to remove and transfer the parison and then, at the moment when the parison is transferred to the pressing die 5, it acts as a plunger to press the parison into the pressing die. Combining the transfer operation with the pressing cycle makes it possible to mold the entire blank face without any interruption. This prevents the formation of folds and rings in the glass as well as an impression of the parison's contact surface.

If the method and apparatus are being used to form aspherical lenses with flange-like rims to be used as automobile headlights, the formation of the lens is not completed at the transfer station where the parison is pressed into pressing die 5. At the transfer station only the aspherical face is formed without the flange-like rim. The subsequent pressing action of the separately moved annular bezel sleeve 15 and the beveled circular face 20 of the plunger 14 cause a bezel rim to be formed.

The reason for dividing the pressing cycle is the following: When blank-molded condenser lenses made from reheated glass rods are produced manually, there is a temperature drop in the glass gob from the peripheral area to the core. In contrast, when the described blank-molding technology is used in an automated operation, the temperature drops from the core to the peripheral area. This results in contraction due to the exterior cooling process following the pressing cycle. This contraction causes a deformation of the aspherical face, particularly in the transition region to the flange-like rim. Although this deformation is scarcely measurable by mechanical means, its effect is nevertheless noticeable in the light channel because the permissible glare value is exceeded. This is the reason why condenser lenses according to the present invention are molded in a two-step operation.

The two-step process for forming a condenser lens with a flange-like rim will now be described. In the first step, only the blank curved face is pressed in the pressing die 5 of the transfer and pressing station and a glass volume and rim above the curved surface of the lens, which volume is needed to eventually form the flange, is initially formed as depicted in the drawing by the movement of the annular bezel sleeve 15.

At the next following station of pressing table 2, the entire upper plane face including the pre-formed rim is intensively fire-polished by means of an $O_2$/gas burner 21. Pressing die 6, which is one position ahead, is located at this station.

In the second step, at the following station of pressing table 2 where pressing die 7, which is one position ahead, is located in the drawing, the flange-like rim is pressed and the deformation of the aspherical face caused by cooling of the parison core is at the same time corrected in a post-pressing operation. The entire upper plane contour of the lens is post-formed whereby the previous deformations due to the thermal conditions are completely eliminated.

For this purpose, a stationary pressing tool, generally designated as 22, is located at the post-pressing station. It is similar in construction to pressing die 13 and can be moved vertically. In particular, it is provided with an annular bezel sleeve 23 that is adapted to the shape of the required flange and a plunger 24 with a planar face.

In this post-pressing operation, the preceding intermediate heating stage is an essential prerequisite. The intermediate reheating makes it possible to achieve an ideal temperature homogenization between the thin-walled rim area and the compact aspherical lens body. A thermal deformation is thereby made impossible since it is only now that the entire lens body assumes its final precise shape by means of this additional post-pressing with a relatively "cold" parison core.

At subsequent stations, the post-pressed lens body is treated by methods known in the art (not depicted). It is, for example, suitably cooled and, at the end of the procedure, finally removed from rotary table 2.

The exemplary embodiment discusses the blank-molding of lenses. However, the method can also advantageously be used for prisms and other compact geometrical molded bodies. The above description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application to enable others skilled in the art to best utilize the invention in various embodiments and with various modifications as are suited to the particular use contemplated. It is intended that the scope of the invention be defined by the following claims.

What is claimed is:

1. A method for producing finished pressed glass bodies having a desired final shape with a high and accurate surface finish by the preforming technology for optical equipment comprising:

introducing a viscous liquid glass gob into a preforming mold in which the glass gob is being preformed into a parison to roughly the desired final shape without touching the surface of the preforming mold;

removing the parison from the preforming mold after a defined period of time;

transferring the parison to a separate final pressing mold;

pressing the parison in the pressing mold in at least one step to its final desired shape with a pressing die;

wherein the removal of the parison from the preforming mold, the transfer of the parison to the separate final pressing mold, and the pressing of the parison with the pressing die are accomplished with a single multi-purpose tool.

2. A method according to claim 1 for blank-molding condenser lenses having a flange on a rim, further comprising:

pressing the parison in the pressing die to create an aspherical, curved face on the parison;

wherein the pressing is accomplished by the multi-purpose tool which tool also forms a volume of glass on the parison above the curved surface from which to create a flange on the parison;

fire-polishing an entire upper planar face of the parison;

subsequent to the fire-polishing, pressing the parison with a plunger shaped to form the flange on a rim of the parison and to correct any deformation in the aspherical face of the parison.

3. An apparatus for producing finished pressed glass bodies having a desired final shape with a high and accurate surface finish according to the preforming technology comprising:

a preforming mold for forming a parison from a liquid glass gob to a shape that roughly approximates the desired final shape, wherein the preforming molds have very small openings in their lower areas for introducing an air cushion;

a liquid glass dispenser for dispensing the gobs into the preforming molds; and a tool having an integrated suction pad and plunger on its face to transfer the parison to a separate final pressing mold where it is molded to its final desired shape;

wherein the tool is a multi-purpose tool that not only transfers the parison to the pressing mold, but also presses the parison in the pressing mold as a pressing die.

4. The apparatus as claimed in claim 3 for constructing aspherical condenser lenses, further comprising:

an independently moveable annular bezel sleeve disposed on the multi-purpose tool;

wherein the annular bezel sleeve slides over the plunger to form a volume of glass on the parison from which to create a flange on the parison;

means for fire-polishing an entire upper planar face of the parison;

a second pressing tool with a plunger shaped to form the flange on a rim of the parison and to correct any deformation in the aspherical face of the parison by pressing the parison subsequent to the fire-polishing.

5. An apparatus according to claim 3, further comprising:

an rotary table on which a plurality of preforming molds are disposed; and an second rotary table on which a plurality of pressing dies are disposed;

wherein the multi-purpose tool is moveable vertically and horizontally to transfer parisons from a preforming mold to a pressing die and further where the second rotary table is indexed so as to switch the pressing dies between various stations.

6. An apparatus according to claim 4, further comprising:

a rotary table on which a plurality of preforming mold are disposed; and an second rotary table on which a plurality of pressing dies are disposed;

wherein the multi-purpose tool is moveable vertically and horizontally to transfer parisons from a preforming mold to a pressing die and further where the second rotary table is indexed so as to switch the pressing dies between various stations.

* * * * *